US009015586B2

(12) United States Patent
Takemura

(10) Patent No.: US 9,015,586 B2
(45) Date of Patent: Apr. 21, 2015

(54) INFORMATION PROCESSING APPARATUS AND METHODS, AND PROGRAM

(75) Inventor: Takashi Takemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 11/477,453

(22) Filed: Jun. 30, 2006

(65) Prior Publication Data

US 2007/0011612 A1 Jan. 11, 2007

(30) Foreign Application Priority Data

Jul. 6, 2005 (JP) ................................. 2005-197824

(51) Int. Cl.
*G06F 3/00* (2006.01)
*G06F 9/44* (2006.01)

(52) U.S. Cl.
CPC .................................... *G06F 9/4446* (2013.01)

(58) Field of Classification Search
USPC ................................................ 715/705, 255
See application file for complete search history.

(56) References Cited

U.S. PATENT DOCUMENTS

| 5,802,429 | A | | 9/1998 | Yamashita | 399/8 |
|---|---|---|---|---|---|
| 6,005,569 | A | * | 12/1999 | Breggin | 715/711 |
| 6,452,607 | B1 | * | 9/2002 | Livingston | 715/705 |
| 7,861,162 | B2 | * | 12/2010 | Lee et al. | 715/255 |
| 2003/0118354 | A1 | * | 6/2003 | Konno | 399/9 |
| 2004/0139073 | A1 | | 7/2004 | Bauchot | 707/4 |
| 2004/0201867 | A1 | * | 10/2004 | Katano | 358/1.15 |
| 2005/0071755 | A1 | * | 3/2005 | Harrington et al. | 715/511 |
| 2005/0256864 | A1 | * | 11/2005 | Semerdzhiev | 707/5 |
| 2006/0123341 | A1 | * | 6/2006 | Smirnov | 715/708 |
| 2006/0130054 | A1 | * | 6/2006 | Bocking et al. | 717/173 |
| 2007/0219716 | A1 | * | 9/2007 | Shiragami | 701/210 |

FOREIGN PATENT DOCUMENTS

| CN | 1403918 | A | 3/2003 | ............ G06F 9/48 |
|---|---|---|---|---|
| CN | 1555523 | A | 12/2004 | ............ G06F 9/44 |
| CN | 1591350 | | 3/2005 | |
| EP | 0630146 | * | 6/1994 | |
| EP | 0630146 | * | 12/1994 | |

(Continued)

OTHER PUBLICATIONS

G. Tomiyama, "File Maker Pro 4.0 Perfect Manual for Macintosh", ASCII Co. Ltd., Apr. 17, 1998, p. 38 (translation of relevant portion).

(Continued)

*Primary Examiner* — Amy Ng
*Assistant Examiner* — Andres E Gutierrez
(74) *Attorney, Agent, or Firm* — Fitzpatrick, Cella, Harper & Scinto

(57) ABSTRACT

According to the claimed invention, an information processing apparatus for displaying a help screen based on help screen information, comprising a determination unit adapted to determine whether a detailed help file corresponding to a program is present or not; and a display control unit adapted to, when said determination unit determines that the relevant detailed help file is present, display a help screen based on help screen information included in the relevant detailed help file, and to, when said determination unit determines that the relevant detailed help file is absent, display a help screen based on help screen information included in a simplified help file installed together with the program.

16 Claims, 12 Drawing Sheets

(56) References Cited

FOREIGN PATENT DOCUMENTS

| | | | |
|---|---|---|---|
| JP | 09-130509 | 5/1997 | ............... H04C 1/00 |
| JP | 2000-025881 | 7/2000 | ............. G01C 21/00 |
| JP | 2001-312462 | 11/2001 | ............. G06F 15/00 |
| JP | 2002-211088 | 7/2002 | |
| JP | 2002-344678 A | 11/2002 | |
| JP | 2003-196092 | 7/2003 | ................ G06F 9/44 |
| JP | 2004-038650 A | 2/2004 | |

OTHER PUBLICATIONS

ASCII.PC, ASCII Co., Ltd. Nov. 1, 1999, vol. 2, No. 11, p. 128 (translation of relevant portion).

Office Action issued on Aug. 8, 2011, in counterpart JPA 2009-055693.

* cited by examiner

F I G. 10
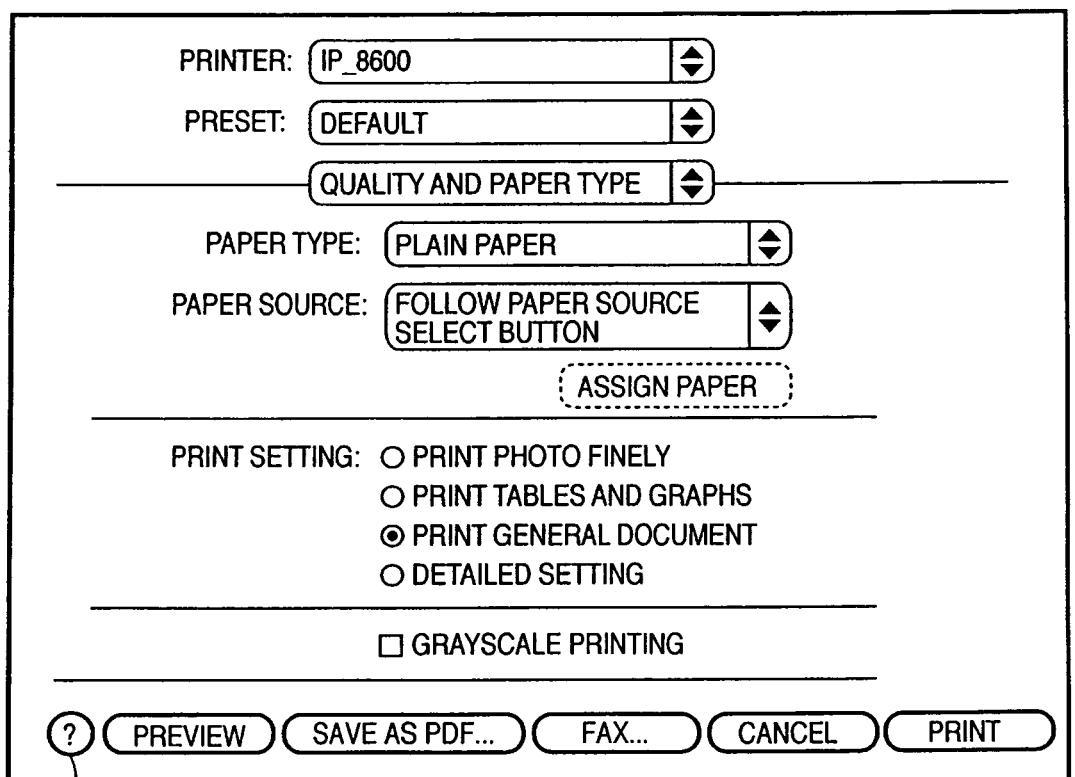

F I G. 11

| | |
|---|---|
| PRINTER: | IP_8600 |
| PRESET: | DEFAULT |

QUALITY AND PAPER TYPE

PAPER TYPE: PLAIN PAPER
PAPER SOURCE: FOLLOW PAPER SOURCE SELECT BUTTON

ASSIGN PAPER

PRINT SETTING:
○ PRINT PHOTO FINELY
○ PRINT TABLES AND GRAPHS
⦿ PRINT GENERAL DOCUMENT
○ DETAILED SETTING

☐ GRAYSCALE PRINTING

PREVIEW | SAVE AS PDF... | FAX... | CANCEL | PRINT

INFORMATION PROCESSING APPARATUS AND METHODS, AND PROGRAM

FIELD OF THE INVENTION

The present invention relates to a help display method from an application program or the like which runs on, e.g., an information processing apparatus, and the information processing apparatus and, more particularly, to an information processing apparatus and method when an application program and help file are separately installed, and a program.

BACKGROUND OF THE INVENTION

Upon installing an application program in a storage device of an information processing apparatus (i.e., a computer), a help screen file (help file) is often installed at the same time. For this reason, when a help screen such as an operation guide or the like is opened from that application program, an effectual help screen can be displayed when the user presses an action button which is provided on a dialog of the application program and is used to display the help screen. As a technique for installing a help file, Japanese Patent Laid-Open No. 2003-196092 discloses the following one. That is, when the program name of a new program to be installed is designated upon installing the new program, the designated program name is output, and a help file corresponding to the program name is installed.

In the above-mentioned patent document (patent reference 1), since the help file corresponding to the program name input upon installing the new program is installed, the help file is also installed upon installing the new program.

However, in recent years, the total size of a help file which describes help information that can be referred to from an application is increasing. This is because unification of electronic instruction manuals/help documents for a plurality of different application programs, commonization of redundant manuals, and improvement of operability of an electronic instruction manual are achieved. Due to diversification of the functions of the application program, the program size of the application program is increasing. For this reason, when a help file is installed upon installing a new program, the installation time may be prolonged, and a large memory size may be consumed upon installation.

In order to solve the above problem, a mechanism that provides an application program and help file as independent files may be used. In such case, the application program and help file must be individually installed.

When the application program and help file are individually installed, an effectual help file corresponding to the application program may not often be installed. In such case, effectual help information cannot be displayed.

SUMMARY OF THE INVENTION

The present invention has been made in consideration of the above problems, and has as its object to display effectual help information in an environment in which a predetermined application program and help file are independently installed.

In order to achieve the above object, the present invention comprises the following arrangement. That is, there is provided a program which can be executed by a computer to display a help screen based on help screen information and is recorded on a recording medium, the program making the computer function as: determination means for determining whether a detailed help file which is installed independently of the program and corresponds to the program is present or not; and display control means for, when the determination means determines that the relevant detailed help file is present, displaying a help screen based on help screen information included in the relevant detailed help file, and for, when the determination means determines that the relevant detailed help file is absent, displaying a help screen based on help screen information included in a simplified help file installed together with the program.

Alternatively, there is provided a program which can be executed by a computer to display a help screen based on help screen information and is recorded on a recording medium, the program making the computer function as: determination means for determining whether a help file having file identification information which matches file identification information of a help file corresponding to a printer driver is present or not; and display control means for, when the determination means determines that the relevant help file is present, displaying a user interface screen including a user operation area used to call the help screen, and for, when the determination means determines that the relevant help file is absent, displaying the user interface screen so as not to allow a user to select the user operation area used to call the help screen.

An information processing apparatus according to an aspect of the present invention comprises the following arrangement. That is, there is provided an information processing apparatus for displaying a help screen based on help screen information, comprising:

determination means for determining whether a detailed help file which corresponds to a program is present or not; and display control means for, when the determination means determines that the relevant detailed help file is present, displaying a help screen based on help screen information included in the relevant detailed help file, and for, when the determination means determines that the relevant detailed help file is absent, displaying a help screen based on help screen information included in a simplified help file installed together with the program.

An information processing method according to an aspect of the present invention comprises the following steps. That is, there is provided an information processing method for displaying a help screen based on help screen information, comprising:

a determination step of determining whether a help file having file identification information which matches file identification information of a help file corresponding to a printer driver is present or not; and a display control step of displaying, when it is determined in the determination step that the relevant help file is present, a user interface screen including a user operation area used to call the help screen, and displaying, when it is determined in the determination step that the relevant help file is absent, the user interface screen so as not to allow a user to select the user operation area used to call the help screen.

According to the present invention, upon reception of a help display request, effectual screen display can be made depending on the installation state of a help file, thus improving user operability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 shows an example of a displayed screen according to the second embodiment of the present invention;

FIG. 11 shows an example of a displayed screen according to the second embodiment of the present invention.

DETAILED DESCRIPTION OF THE PREFERRED EMBODIMENTS

[First Embodiment]

In this embodiment, an application includes file information (identifier and version), and incorporates simplified help data in advance. A corresponding help file incorporates the file information (identifier and version). By utilizing this file information, processing for confirming the installation state of the help file and processing for confirming coherence between the application and help file are executed upon displaying the help file. With this processing, the displayed contents can be switched between a case wherein the help file is installed in a storage device of an information processing apparatus and a case wherein it is not installed.

The displayed contents can be switched between a case wherein the help file stored in the storage device of the information processing apparatus can be displayed from the active application and a case wherein it cannot be displayed. By determining whether or not the help file corresponding to the active application exists, a help screen display mode comprising the switching function between display and non-display of a user operation area (to be referred to as a help button hereinafter) to call a help screen, and its control method are provided.

<Computer System>

Figure 1:
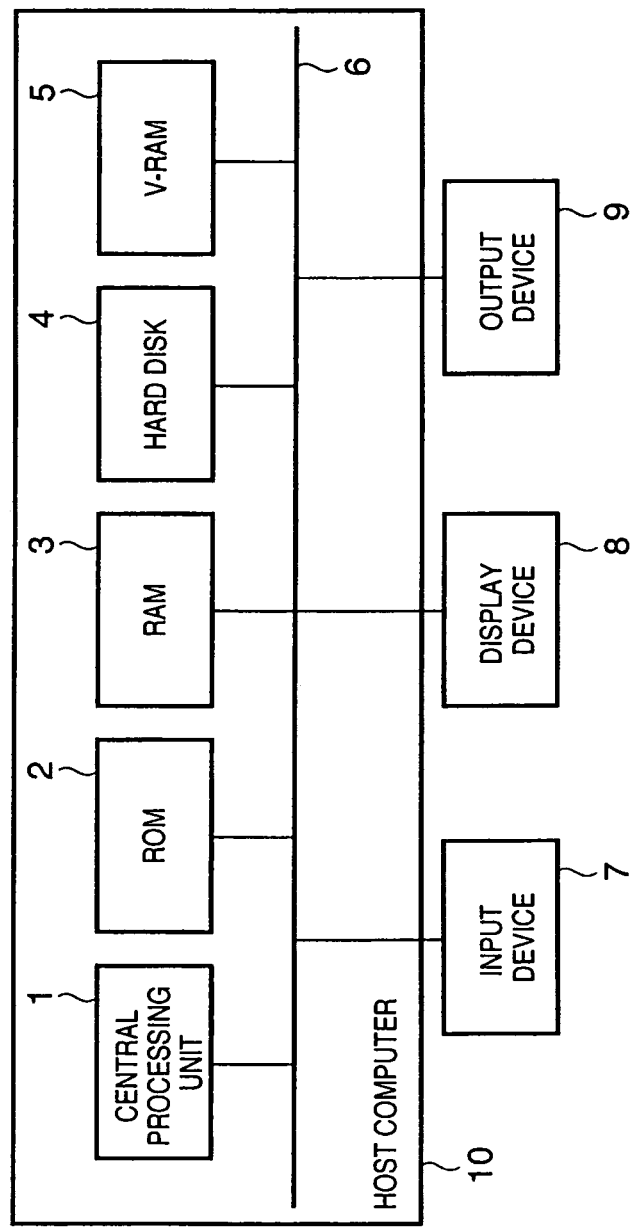
FIG. 1 is a block diagram showing the arrangement of an information processing apparatus to which the present invention is applied.

FIG. 1 is a schematic hardware block diagram of an information processing system which can implement a help display system of this embodiment. This information processing system is configured by connecting, to a host computer 10, an input device 7 which comprises a keyboard, mouse, and the like, and with which the user can input a command of a cursor position, and various kinds of information, a display device 8 which is used to display images such as a user interface screen, help screen, and the like of an application program, and an output device 9 which is used to, e.g., print out image data.

The host computer 10 comprises a central processing unit (to be abbreviated as a CPU hereinafter) 1 which controls the system, a read-only memory (to be abbreviated as a ROM hereinafter) 2 which pre-stores information required for the entire apparatus, a memory (to be referred to as a RAM hereinafter) 3 which is free to read and write as a work area, a magnetic disk device (to be referred to as a hard disk hereinafter) 4 which stores various data and programs, and a memory (to be referred to as a V-RAM hereinafter) 5 which stores image data of displayed screens. The respective blocks are connected via a bus line 6.

When an application program and a help file created in correspondence with it are installed, these files are stored in the hard disk 4. Note that the application program and help file are not always installed at the same time, as described above, and only one of them is often installed. Note that a help file which is installed independently of an application program is defined as a detailed help file in the following description.

Then, information (location, name, and the like) required to execute the application program is registered in a database (called a registry or the like) managed by an operating system (OS). When the installed application program is launched, it is scheduled by the OS, an executable file is loaded onto the RAM 3, and the loaded program is executed by the CPU 1. The application program executes display and print operations by calling input and output functions of the OS. That is, the application program implements the display and print operations by utilizing functions provided by the OS. In the following description, the application program will be simply called an application in some cases.

<Example of File Structure>

Figure 3:
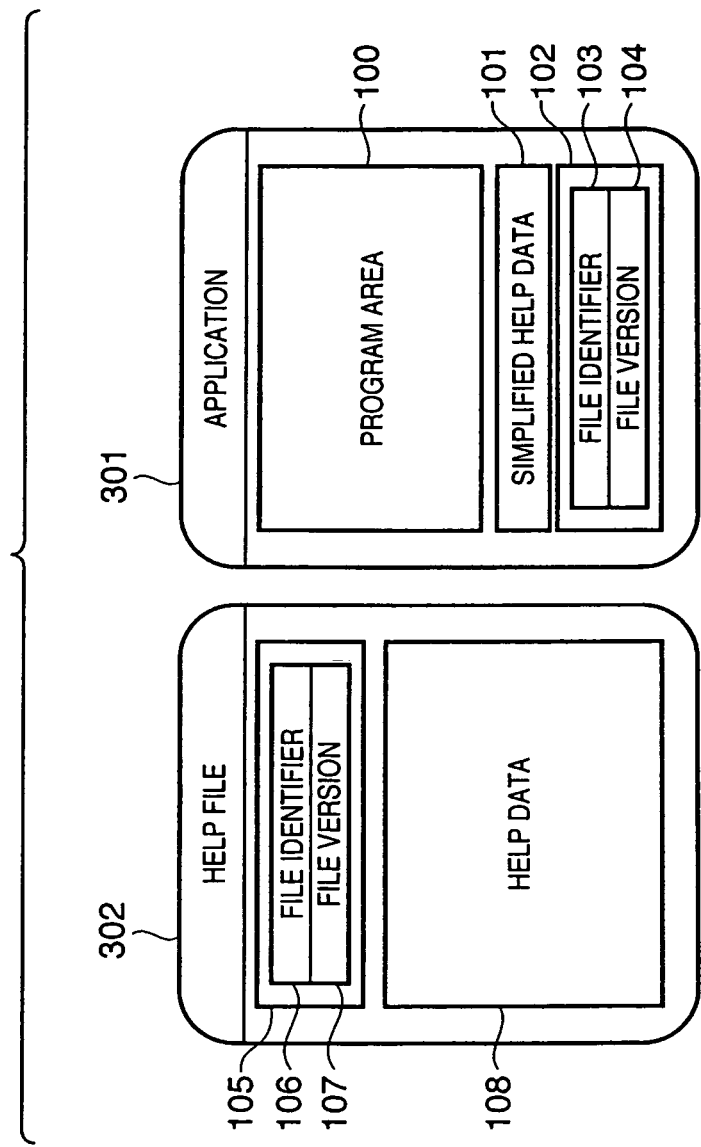
FIG. 3 is a block diagram showing the internal structure of a file according to the first embodiment of the present invention.

FIG. 3 is a block diagram showing the internal structure of a program file (application file) 301 of the application of this embodiment and its help file 302. The application file 301 is configured by three blocks, i.e., a program area (100) that stores executable codes, an area (101) that stores simplified help data uniquely prepared by the application, and a file information area (102) that stores a file identifier (103) and file version (104) of the help file. That is, the file information area includes the file identifier as file identification information and the version of the file. Also, location information of a detailed help file (to be described later) may be included as the file identification information.

Note that the simplified help data 101 is not always included. As information for determining the presence/absence of the simplified help data 101, header information including information indicating the presence/absence of respective areas is provided to an application file (not shown). Alternatively, information indicating a unique identifier and area length for each area is appended to the head of that area. In this way, whether or not the application file includes an area (i.e., simplified help data 101) having an identifier unique to the simplified help data 101 can be checked. In FIG. 3, the application file includes the simplified help data. However, the present invention is not limited to this, and simplified help data may be held as an independent file in association with the application program. In the present application, a help file which is installed together with the application program will be referred to as a simplified help file.

A detailed help file 302 is configured by two blocks, i.e., a file information area (105) that stores its file identifier (106) and file version (107), and a help data area (108) that stores data required to display a help screen. Especially, the file identifier and file version stored in the file information areas 102 and 105 are information used to associate the application program with the detailed help file. In this manner, the application file is created to include the file identifier and version of the corresponding detailed help file. Conversely, the detailed help file corresponding to the application program is given with the file identifier and version of the detailed help file included in that application file.

In this embodiment, the application file and the corresponding detailed help file are installed in a single folder. If these files are installed in different folders, the location of the detailed help file is registered in, e.g., the registry or the like under the management of the OS. For example, information indicating the location of the help file is registered in a predetermined storage area (e.g., a registry folder) generated upon installation of the detailed help file. In the present application, registry files of respective layers in the registry having a hierarchical structure will be defined as registry folders. The application program installed independently of the detailed help file is set to acquire the location information (path) of the detailed help file from a predetermined registry folder in the registry upon searching for the detailed help file. When a detailed help file corresponding to a printer driver is installed, a "help" registry folder is generated in the layer of a "Printers" registry folder in the registry, and the location information (path) of the detailed help file is registered in that help registry folder. The printer driver which is installed independently of the detailed help file is set to search for the "help" registry folder in the layer of the "Printers" registry folder upon searching for the detailed help file. Note that the help registry holder need only be generated when the detailed help file is installed in the host computer for the first time, and the location information of the detailed help file installed before generation of the help registry folder is stored in a help registry holder as a predetermined storage area which has already been generated in accordance with installation of the detailed help file.

When the help file is to be opened from the application which is installed independently of the detailed help file, the detailed help file is specified by the location information (path) of the detailed help file registered in the predetermined registry folder and the file identifier 103 and version 104 saved in the file information area 102 upon pressing of a help button. Of course, when the application file and the corresponding detailed help file are saved in a single folder, the location information of the detailed help file may be registered in the registry. When the detailed help file can be specified, the application file displays a help screen based on help data held by the detailed help file.

<Calling Help Display>

Figure 2:
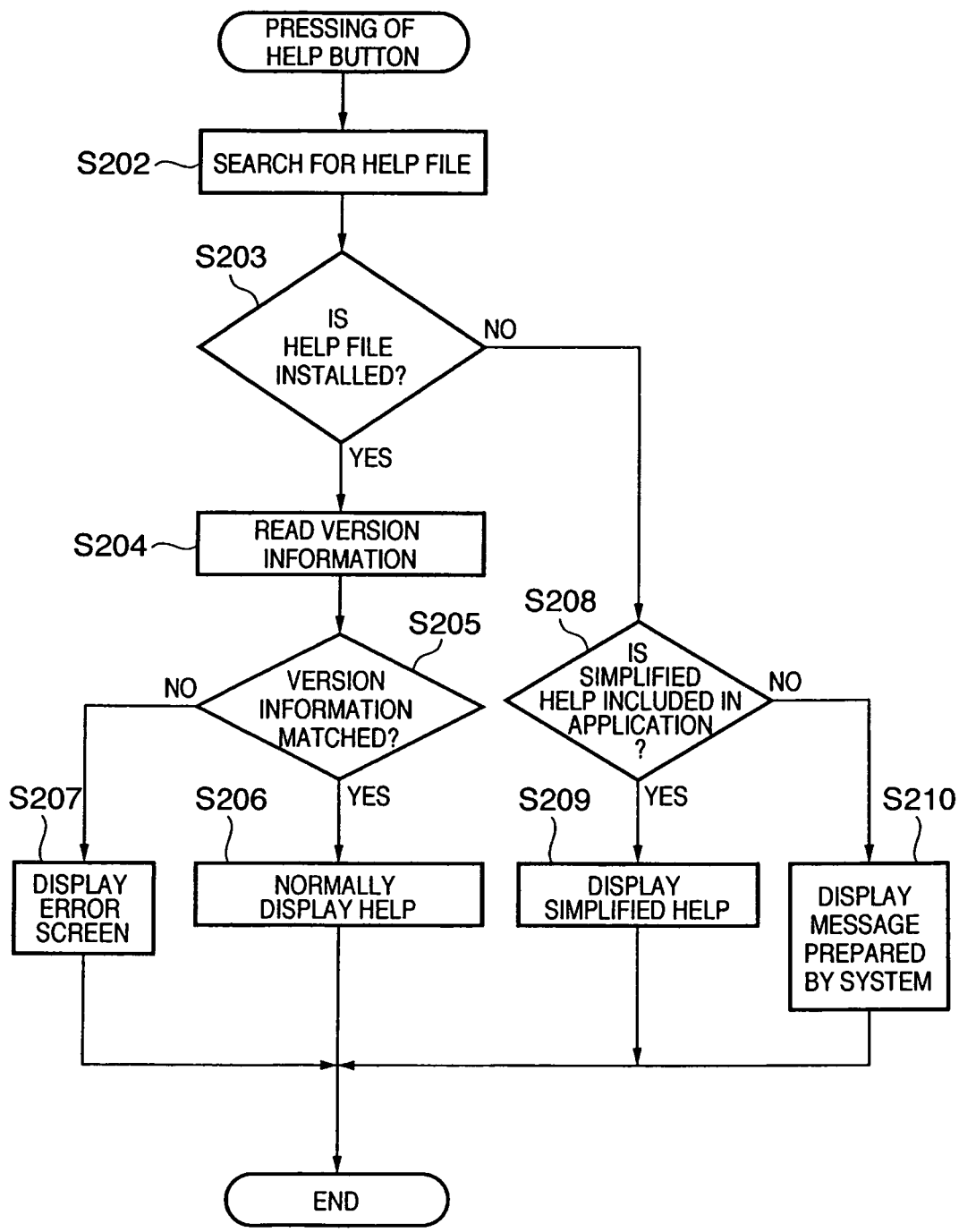
FIG. 2 is a flowchart showing the flow of processing according to the first embodiment of the present invention.

FIG. 2 is a flowchart executed when the help file is opened from the application program in this embodiment. The sequence shown in FIG. 2 starts in the wake that the user requests to read out and display the help file by, e.g., pressing the help button in the application program (to be referred to as a help request hereinafter). As a precondition for this, the application program is running, and displays a user interface screen including the help button. The application program may execute any processing such as document processing, image processing, and the like as long as it satisfies this condition and executes the sequence of FIG. 2 in response to the request of the help screen. The program which is to satisfy the above condition is called the application program for the purpose of convenience, but it need not be an application program. For example, a software module called a printer driver is available to execute processing unique to a printer, and the printer driver is a program which belongs to the OS in a broad sense. However, some printer drivers have a function of displaying a user interface to allow the user to make print settings and also displaying a help screen for the print settings. For this reason, the printer driver is not normally called an application program, but the present invention can be applied to the printer driver. In this way, the present invention can be applied to a program which displays a help screen based on help screen information and can be executed by the computer. In this embodiment, the detailed help file corresponding to the application program will be explained, but such application program is not limited to an application, as described above. For example, the present invention may be applied to the printer driver.

An arbitrary application program (to be referred to as an application hereinafter) which is installed in the hard disk 4 is running, and displays a dialog (user interface screen) including an action button used to display a help screen (to be referred to as a help button hereinafter) on the display device 8. In this state, when the user presses the help button, the processing shown in FIG. 2 starts. Note that steps in the flowcharts described in the present application are processed by the CPU 1 in the host computer 1 shown in FIG. 1.

The application program that received the help request (i.e., whose help button on the displayed user interface has been pressed) (such application program will be referred to as a target application or target application program hereinafter) searches to see if a detailed help file corresponding to that application program exists in the hard disk 4 (step S202). More specifically, as described above, the application program is set with registry folder information in which the location information of the corresponding detailed help file is registered. Hence, the application program recognizes the location information of the detailed help file registered in the set registry folder information to search if the detailed help file is stored at a location corresponding to the recognized location information. The application program analyzes the detailed help file found in step S202. The application program searches for the corresponding detailed help file based on the file identifier 103 of the application file 301 and information described in the file information area 105 stored at the head of the detailed help file 302, i.e., the file identifier 106 (step S203). It is checked in step S203 if a detailed help file having the file identifier 106 that matches the file identifier 103 described in the file information area 102 of the target application program is installed. That is, in step S203 the presence/absence of a detailed help file having file identification information which matches that of the detailed help file corresponding to the application program is checked.

If a relevant detailed help file is installed, the application program reads out the version information 107 described in the file information area 105 of the relevant detailed help file (step S204). Next, the application program checks if the version information 107 of the relevant detailed help file read out in step S204 matches the version information 104 of the target application (step S205). More specifically, since the version information of the application and that of the detailed help file are stored, as shown in FIG. 3, the checking processing in step S205 can be attained when the application program refers to the file versions 104 and 107 of respective files. That is, with the processing in steps S203 and S205, the presence/absence of the detailed help file which corresponds to the application program and is installed independently can be determined.

If it is determined in step S205 that the version information of the target application matches that of the relevant detailed help file, that is, if it can be confirmed that the coherence between them is maintained, the application program opens the relevant detailed help file and displays a help screen based on the contents of help screen information included in that detailed help file (step S206). More specifically, since the detailed help file shown in FIG. 3 is stored in the hard disk 4, step S206 is implemented when the application program reads out the help data 108 (help screen information) from the stored detailed help file. Note that FIG. 4 shows a display example.

Figure 4:
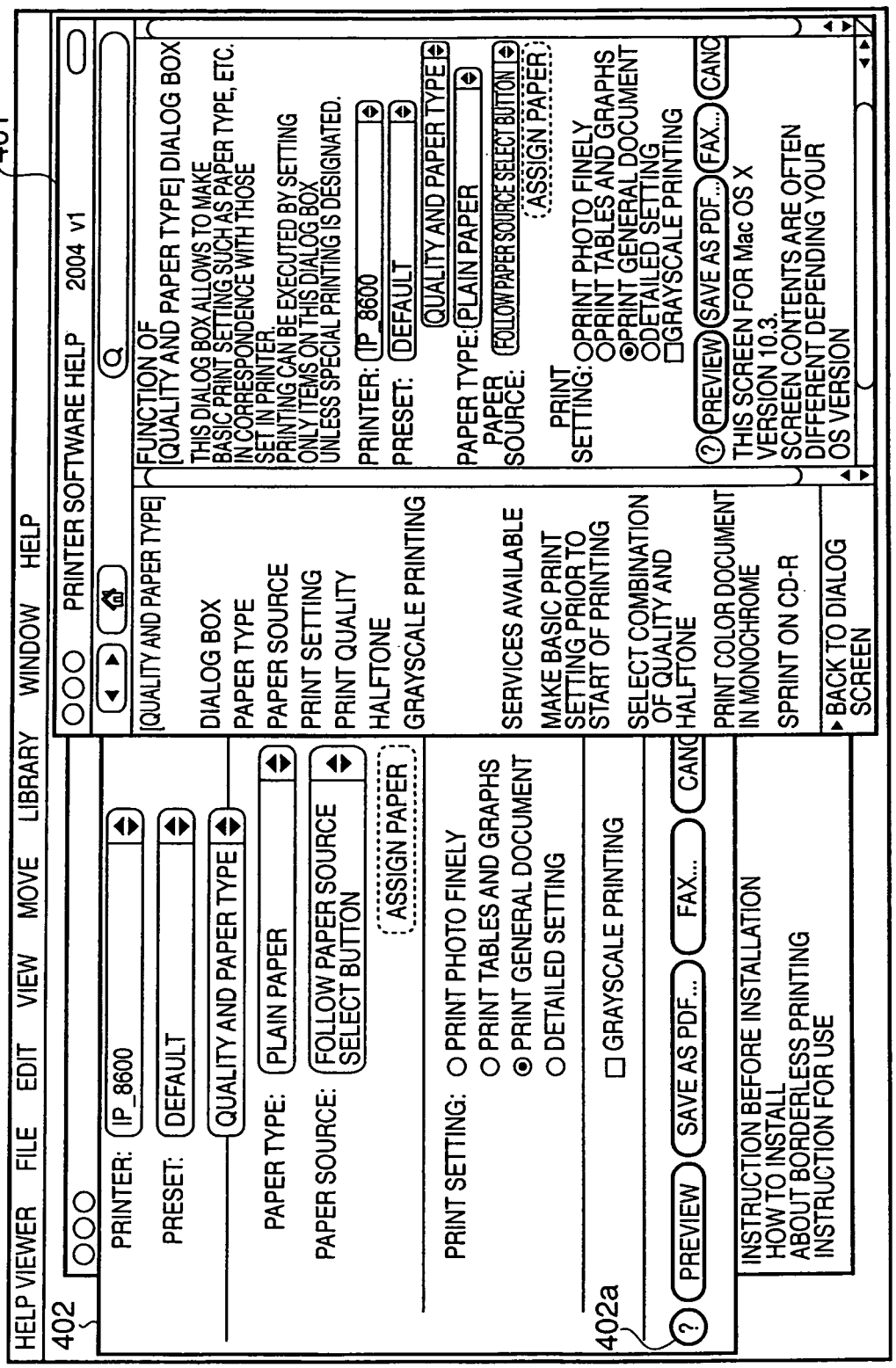
FIG. 4 shows an example of a displayed screen according to the first embodiment of the present invention.

Referring to FIG. 4, the contents of a display area 401 are those of the detailed help file, i.e., a help screen area. A display area 402 is a user interface of the application program (the printer driver in this example). The user interface includes an action button (help button) 402a used to issue a help request. Pressing the help button 402a by the user (more specifically, clicking an area of the button 402a) is to issue the help request. In response to this request, the sequence shown in FIG. 2 starts. The help screen area 401 includes a screen shot of the user interface of the printer driver. This screen shot has a hypertext structure linked with comments of respective areas of the user interface. In this manner, if a detailed help file having the file information 105 that matches the file information 102 of the detailed help file of the application is found, it is determined that the detailed help file is the one that matches the application. The contents of that detailed help file are displayed on the help screen area. That is, if it is determined in steps S203 and S205 that the relevant detailed help file is found, a help screen is displayed based on the help screen information included in the relevant detailed help file.

Figure 5:
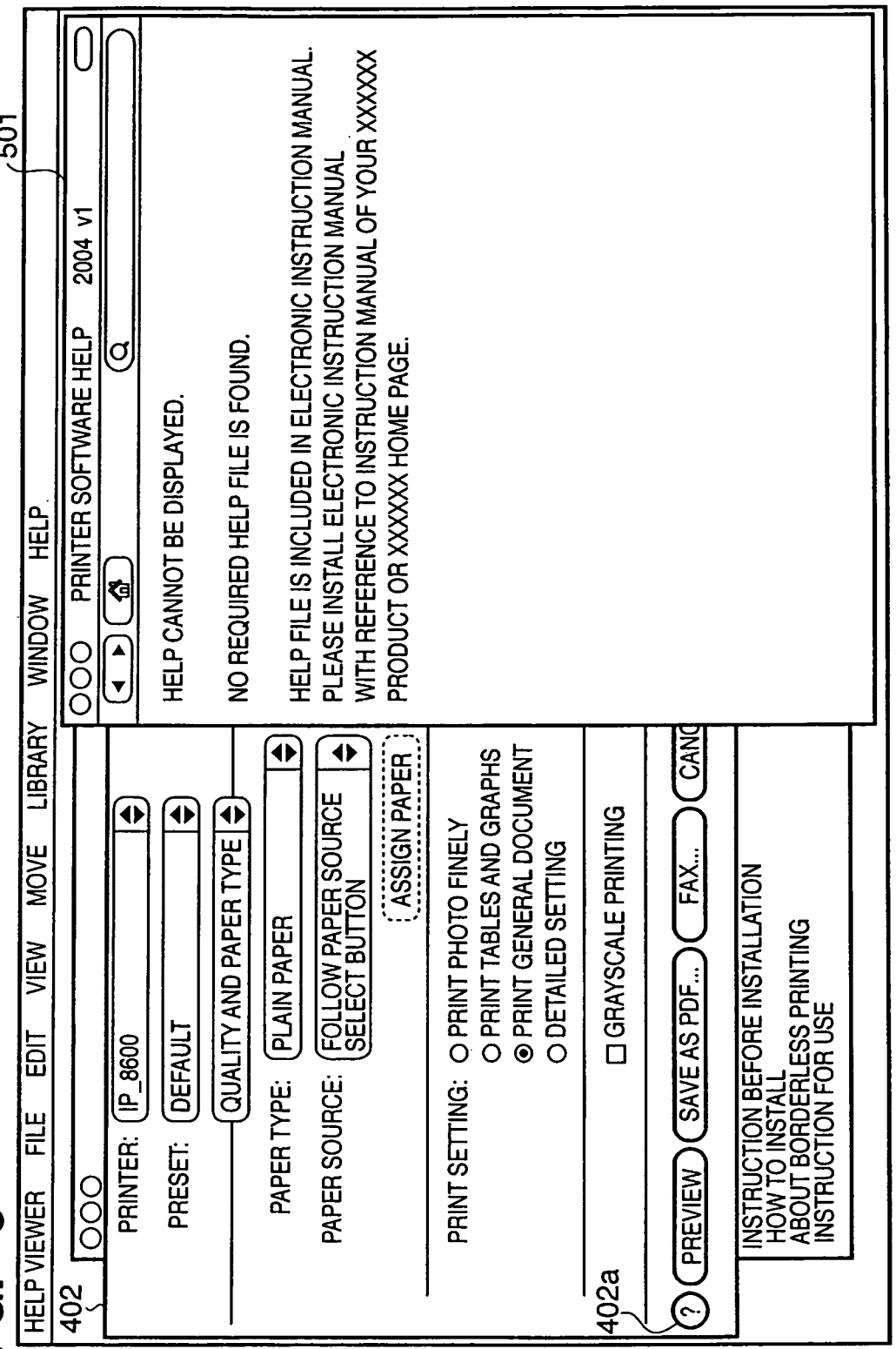
FIG. 5 shows an example of a displayed screen according to the first embodiment of the present invention.

On the other hand, if it is determined in step S205 that the file version 107 of the relevant detailed help file does not match the file version 104 of the target application, i.e., that the two files are not coherent, an error screen which is determined in advance is displayed (step S207). The error screen prompts the user to install a detailed help file corresponding to the target application. FIG. 5 shows an example of the error screen. Note that information to be displayed as the error screen is held in the application file 301 shown in FIG. 3. In this flowchart, if the two pieces of version information do not match in step S205, the error screen is displayed. For example, if the two pieces of version information do not match, the flow may advance to step S208 to display a simplified help if it is available. In this case, if it is determined in steps S203 and S205 that at least one of the file identifier and file version of the file corresponding to the program is different from at least one of those of the detailed help file, and no relevant detailed help file is found, a help screen is displayed based on help screen information included in the simplified help file which is installed together with the application program.

Referring to FIG. 5, an error screen area 501 is displayed in place of the help screen area 401 in FIG. 4. The error screen displays a message indicating that no effectual detailed help file corresponding to the target application is installed (or no such file is found ("no effectual detailed help file is found")), and the location information of an effectual detailed help file.

If it is determined in step S203 that no detailed help file corresponding to the target application is found, it is checked in step S208 if the simplified help data 101 is included in the application file 301. As described above, the application file 301 holds header information including information indicating the presence/absence of respective areas. Hence, the application program can determine based on the header information indicating the presence/absence of the simplified help data 101 or the like if the application file includes the simplified help data 101.

Figure 6:
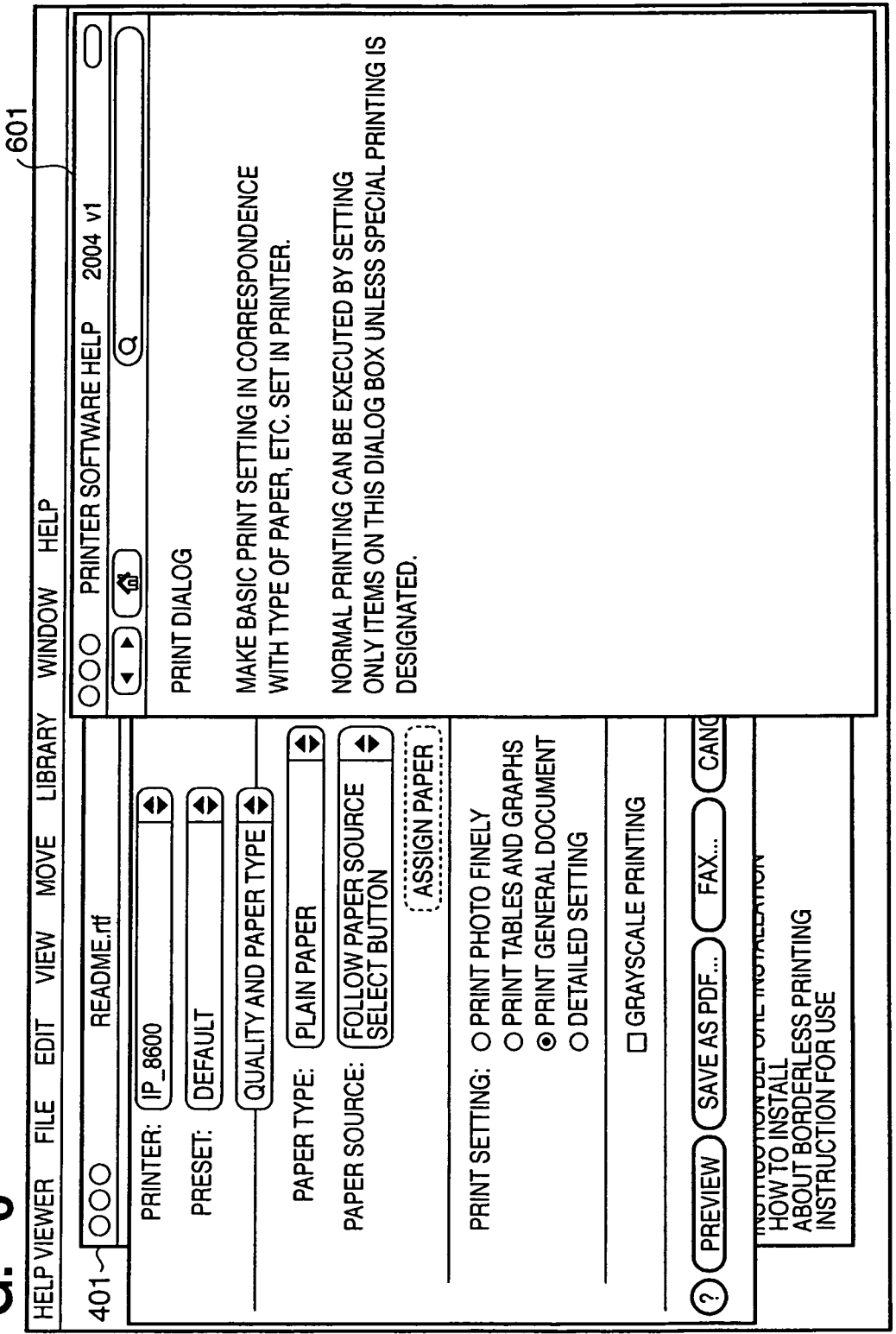
FIG. 6 shows an example of a displayed screen according to the first embodiment of the present invention.

If it is determined in step S208 that the application file 301 of the target application includes the simplified help data 101, the application program reads out the simplified help data 101 and displays a simplified help screen on the display device 8 (step S209). FIG. 6 shows a display example of the simplified help screen. A simplified help display area 601 displays information described as the simplified help data. Note that in step S209 not only the simplified help is displayed but also a message that prompts the user to install the detailed help file can be displayed. This message may be included in the Simplified help data.

Figure 7:
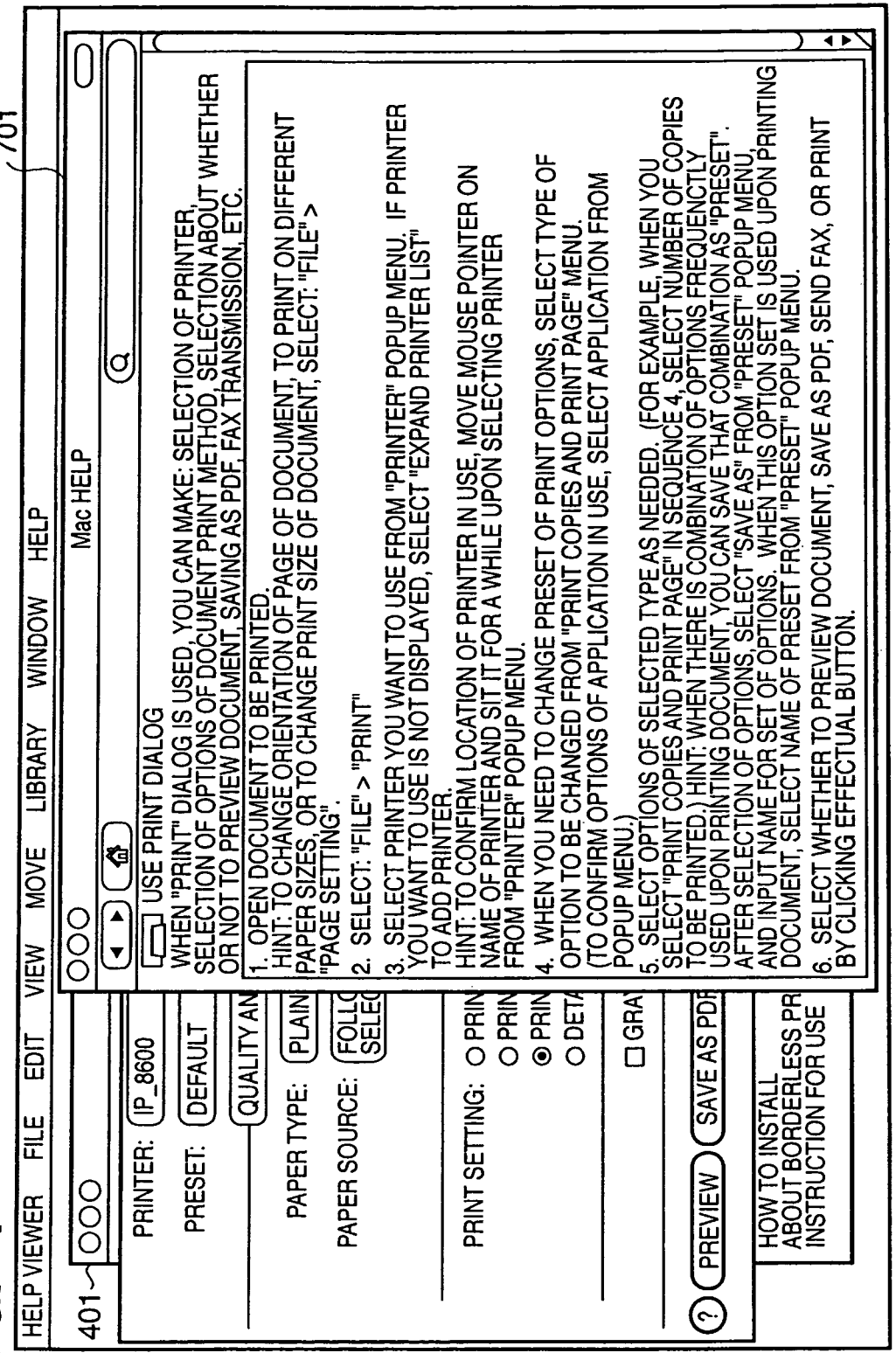
FIG. 7 shows an example of a displayed screen according to the first embodiment of the present invention.

If it is determined in step S208 that the running application does not include any simplified help data 101, a help screen having a message prepared in the system (OS) is displayed on the display device 8 (step S210). The message displayed at that time depends on the system. FIG. 7 shows a display example of such message. A help display area 701 displays the message acquired from the OS. If the OS does not provide such help screen, the same error screen as in step S207 may be displayed in step S210.

In case of the printer driver, print settings can be made using different screens, i.e., a page setting screen, paper source setting screen, and the like for different purposes. In this case, the help button can be displayed for each screen, and when the help button is selected, the checking processing (S203 and S205) described in FIG. 2 is executed. As a result, if it is determined that the help file is found, the printer driver recognizes displayed screen information, which is displayed together with the help button when the help button is selected to call the help screen for the printer driver. The printer driver specifies help screen information to be displayed from the detailed help file based on the recognized displayed screen information, and displays a help screen based on the specified help screen information. Upon displaying the simplified help file as well, the same processing is executed.

Furthermore, the help function includes a function of allowing the user to select display of a help file when he or she makes a predetermined operation (e.g., right clicking) on an item whose help information is to be acquired. In this case as well, the checking processing (S203 and S205) described in FIG. 2 is executed in response to selection of display of the help file. As a result, if it is determined that the detailed help file is found, the item corresponding to the help screen is recognized. For example, screen information displayed by the printer driver upon pressing of the help button is recognized. For this purpose, for example, the printer driver saves screen identification information corresponding to the displayed screen in a predetermined save location. In step S206, the printer driver specifies help screen information corresponding to the displayed screen information from the detailed help file based on the recognized screen identification information. A help screen is displayed based on the help screen information for the specified item. Note that the same applies to the simplified help file.

As described above, whether or not the detailed help file is saved is determined in response to selection of the help button according to the present application. If the application program determines that the detailed help file is saved, it recognizes a sheet displayed upon selection of the help button or an item selected upon requesting a help display. Then, the application program can specify help data corresponding to the recognized sheet or item from the detailed help file (or simplified help file) and can display the specified data.

With the above sequence, according to the invention of this embodiment, a detailed help file having file information that matches file information which is saved in advance in an application file can be displayed in association with the application. Even when a detailed help file which matches the file identifier (file name) of the detailed help file held by the application is found, if their file versions (version information) do not match, that detailed help file is not displayed. In this way, when no corresponding detailed help file is held, a simplified help file (or error screen) included in the application program is displayed. As a result, when the versions do not match, an ineffectual detailed help file can be prevented from being displayed as the one corresponding to the application. Hence, operation errors of the user can be prevented, and effectual information can be displayed using the simplified help file of the application. Alternatively, a message that prompts the user to install an effectual detailed help file corresponding to the application program can be displayed. This message can prompt the user to install an effectual detailed help file, thus improving the operability of the user. In this case, the application program can install a detailed help file corresponding to the program from an information processing apparatus (e.g., a server) connected to the computer by a predetermined user operation. Even when no predetermined user operation is made, installation processing of a detailed help file may be executed if it is determined in steps S203 and S205 that no relevant detailed help file is found. The help screen displayed as a result of the above processing is displayed using the output function provided by the host computer.

[Second Embodiment]

The second embodiment will be described below. The arrangement of the computer system is the same as that in the first embodiment, as shown in FIG. 1. In this embodiment, when a help button is designated, display of the help button itself is changed in accordance with a detailed help file in place of changing the appearance of a help screen.

Figure 9:
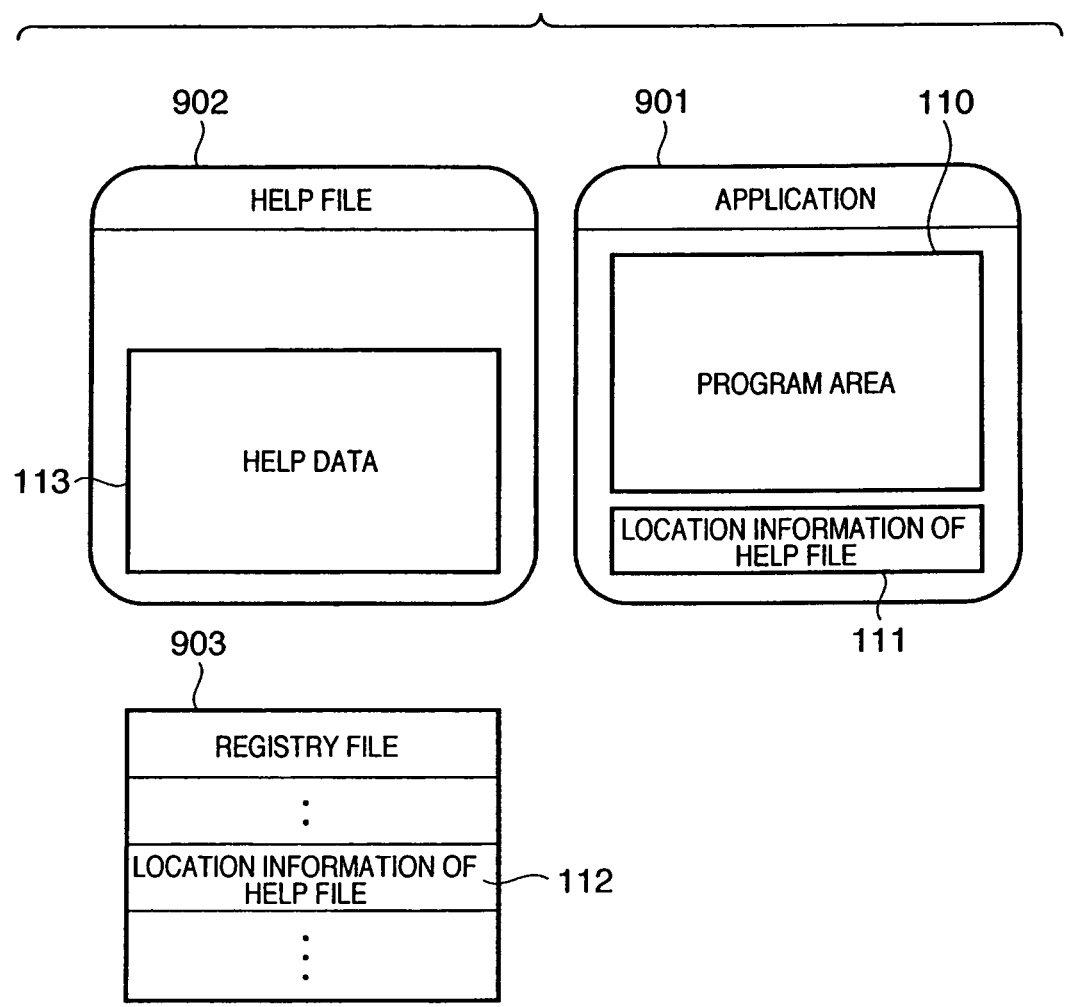
FIG. 9 is a block diagram showing the internal structure of a file according to the second embodiment of the present invention.

FIG. 9 is a block diagram showing the internal file structure of an application file and detailed help file according to the second embodiment of the present invention.

An application file 901 is configured by a program area (110) that stores executable codes, and location information (111) that describes the storage location of a detailed help file required when the application displays a help screen in the hard disk. Note that in the second embodiment, the application file 901 includes the location information 111 of the detailed help file. However, as described above, the application file 901 may include predetermined registry folder information in which the location information of the detailed help file is registered. In this case, the application program checks the presence/absence of a detailed help file based on that of the registered location information with reference to the predetermined registry file. However, in the second embodiment, assume that the application file 901 includes the location information of the detailed help file.

A detailed help file 902 is configured by a help data area (113) that stores data required to display a help screen. A registry file 903 includes location information (112) indicating the storage location of the detailed help file required when the application displays the help screen in the hard disk. When the application program is installed, a record corresponding to that application program is registered in a registry so as to record information associated with that application.

When both the application program and corresponding detailed help file are effectually installed, the location information 111 of the detailed help file included in the application program and the location information 112 of the detailed help file registered in the registry in association with that application should have the same contents. That is, the two pieces of location information (position information) 111 and 112 that describe the storage location of the detailed help file included in the respective files are the ones that associate the application and detailed help file with each other.

In this way, the application file is created to include the location information of the corresponding detailed help file. The detailed help file corresponding to the application program must be installed at a place indicated by the location information included in the corresponding application file. Since an installation place can be set in advance as a predetermined place by an installer, the user need not know the installation place. If these conditions are satisfied, it is determined that the application and detailed help file have a correspondence (coherence) between them. Note that the save destination of the location information 112 is not limited to the registry but the save destination may be any other places as long as it is associated with the application and can be specified upon installation of the detailed help file and upon execution of the application. When the user selects an arbitrary storage area and saves the detailed help file, the detailed help file is installed at a location different from the location information of the detailed help file included in the application. In this case, as in the first embodiment, the location information of the detailed help file is confirmed with reference to the registry folder area as a predetermined storage area that stores the location information of the detailed help file included in the application program.

In this embodiment, when the detailed help file alone is installed in the hard disk, file path information corresponding to a place where the detailed help file is installed is registered as the location information of the detailed help file in a predetermined storage area associated with the application file (a field associated with the application in the registry in this example). In this way, the location information 112 of the detailed help file is registered in the registry 903.

Figure 8:
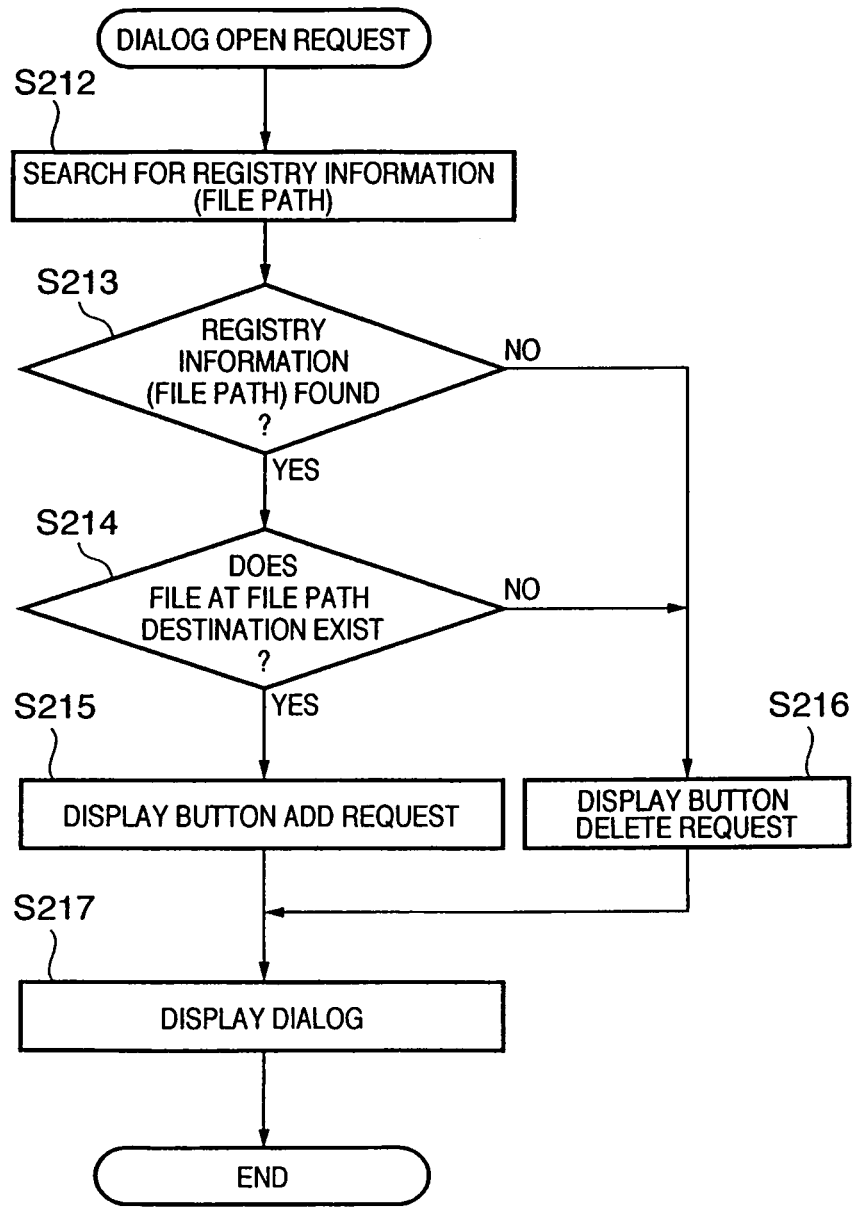
FIG. 8 is a flowchart showing the flow of processing according to the second embodiment of the present invention.

FIG. 8 is a flowchart showing the processing sequence by the application program according to the second embodiment. In response to a user operation from a menu of a running application (to be referred to as a target application hereinafter) or upon launching the target application, an open request of a dialog (user interface) is issued. FIG. 8 starts from this timing.

The application program searches for the location information (to be referred to as file path hereinafter) 112 of a detailed help file recorded in the registry in the hard disk in association with the target application (step S212). If the application program determines that the location information 112 of the detailed help file is recorded in a corresponding record of the registry, it is checked if that location information 112 matches the location information 111 of the detailed help file included in the target application 901. The application program checks in step S213 the presence/absence of the location information 112 of the detailed help file that satisfies this condition.

If it is determined in step S213 that the location information 112 of the detailed help file is found, the application program can determine that the detailed help file corresponding to the target application is installed. On the contrary, if no such information is found, the application program can determine that no detailed help file is installed.

However, since the presence/absence of the location information 112 of the detailed help file is merely checked in step S213, it is unknown whether or not the detailed help file corresponding to the target application is installed in fact. Hence, the application program checks in step S214 if a detailed help file is stored at a file path destination indicated by the location information of the detailed help file. If the file is found, it is determined that the relevant detailed help file is a detailed help file corresponding to the target application. If the location information includes a file name, even when a plurality of files are stored in a single folder, one of these files can be specified. In this embodiment, assume that the location information includes a file name. That is, with the processing in steps S213 and S214, the application program can check the presence/absence of a help file having file identification information that matches file identification information of the help file corresponding to that application program.

If it is determined as a result of checking in step S214 that the file is stored, the application program issues an add request of an action button (i.e., a help button) required to display a help screen on a dialog screen which is to be opened by the target application (step S215). Then, the application program displays a dialog having an action button 120, as shown in FIG. 10 (step S217).

That is, if it is determined in step S214 that the detailed help file corresponding to the application file is stored, a user interface screen including the help button required to call a help screen is displayed. In steps S215 and S217, the processing is done according to the specification of the OS that forms an execution environment of the target application. When the user presses the displayed action button 120, the target application displays a help screen in response to the display request.

If it is determined in step S213 or S214 that the relevant location information or detailed help file is not found, it is determined that no detailed help file corresponding to the target application found. In this case, the application program issues a delete request of the action button (help button) so as not to display a help screen on a dialog to be opened (step S216). Then, the application program displays a dialog without any action button 120, as shown in FIG. 11 (step S217). For this reason, the user cannot display a help screen. That is, if it is determined in step S214 that no relevant help file is found, a user interface screen is displayed so that the user cannot select the help button used to call a help screen. Note that displaying the user interface screen so that the user cannot select the help button is not only a case wherein no help button is displayed, as described above, but also a case wherein the help button is grayed out so as not to be selected.

As described above, in this embodiment, when no effectual detailed help file corresponding to the application is installed, no help button is displayed on the user interface of the application. In this way, the user can be prevented from referring to a wrong detailed help file, and problems (operation errors) due to use of the wrong detailed help file can be avoided. Note that the help file described in the second embodiment is a detailed help file which is to be installed independently of the application program. Also, the user interface screen generated according to the second embodiment is displayed using the output function provided by the host computer.

[First Modification]

In the second embodiment, the path information of the detailed help file is registered in the registry upon installation of the detailed help file. By contrast, in this modification, the detailed help file has path information of itself in place of using the registry. When a help display request is issued by the application, path information held in the application file of the target application is referred to and a detailed help file that matches the path information is searched for. If the relevant file is found, the help button is displayed on the user interface of the application. If the two pieces of collated path information do not match, it is determined that no detailed help file is found, and no help button is displayed on the user interface.

Furthermore, the target application may collate the path information held in the application file with that included in the detailed help file itself. In this case, if the two pieces of collated path information match, it is determined that the relevant detailed help file is the one corresponding to the target application, and the help button is displayed on the user interface of the application. If the two pieces of collated path information do not match, it is determined that no relevant detailed help file is found, and no help button is displayed on the user interface.

Alternatively, when the above checking processing is executed in response to pressing of the help button as in the first embodiment, the relevant detailed help file is opened as the one corresponding to the target application, and its contents are displayed. If no file indicated by the path information is found, it is determined that no relevant detailed help file is found. In such case, as will be described in the third modification later, the detailed help file may be downloaded and installed.

[Second Modification]

The second modification of the embodiment of the present invention will be described below. The embodiments have explained the help screen display system and its control method when a help screen is to be displayed from a dialog displayed by the application. An electronic instruction manual used to display a help screen normally describes the screen shot of the UI of the application. Only when the electronic instruction manual and application have different versions, if the UI of the application is older, it is determined that a new application is available. With this determination, the application program can display a message that prompts the user to upgrade the application. If it is determined that the electronic instruction manual is older, the application program can display a message that prompts the user to acquire a new electronic instruction manual.

Furthermore, the above embodiments have described the help screen display system and its control method when no electronic instruction manual is found or its older version is used. For example, if no new electronic instruction manual is found, after a message that asks "do you want to download new one" is displayed at the opening timing of the UI of the running application, the new electronic instruction manual may be automatically downloaded.

Figure 12:
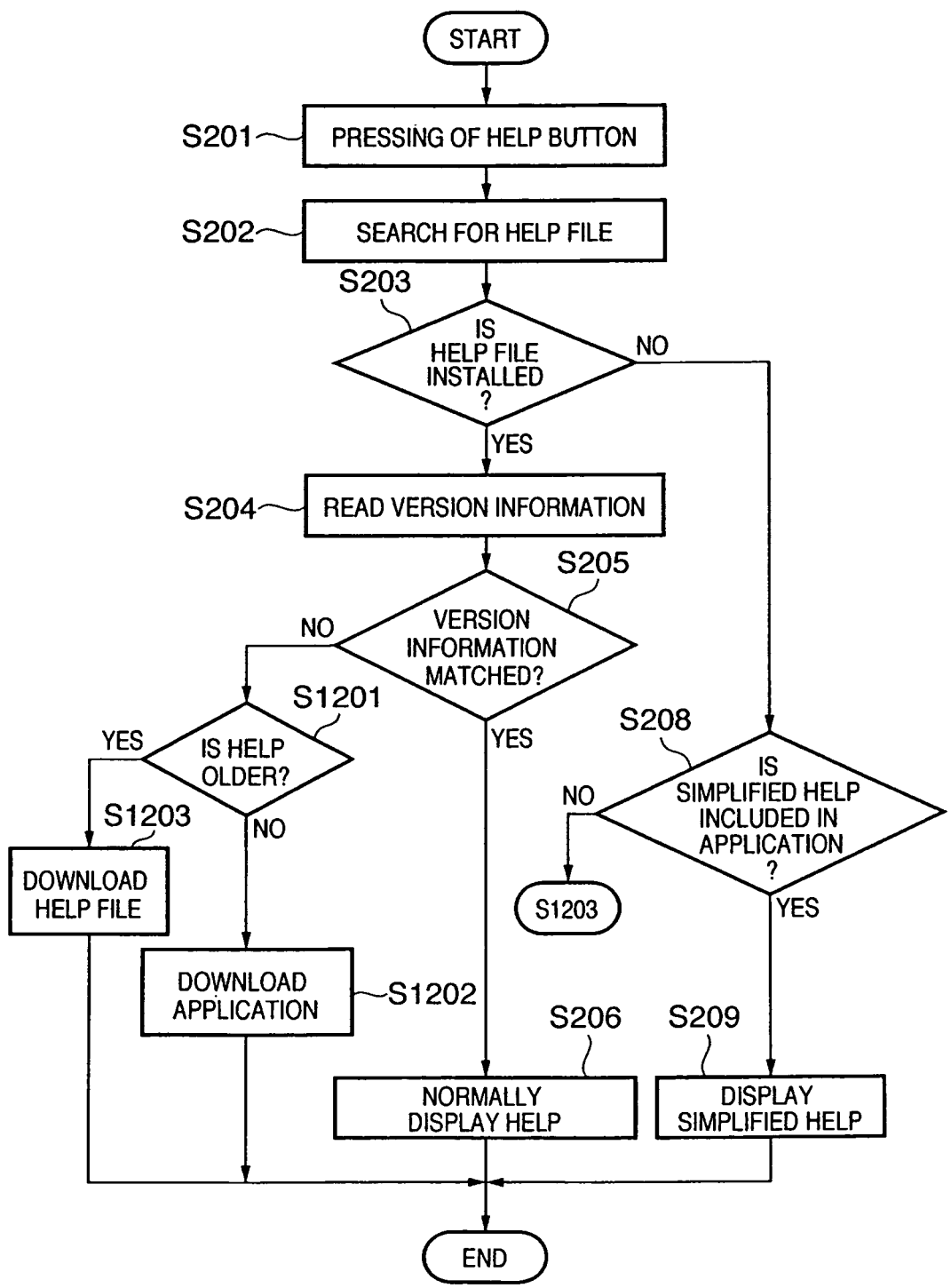
FIG. 12 is a flowchart according to a modification of the first embodiment of the present invention.

If the version of the program is older, the program file may be downloaded. In this case, the downloaded program must be installed after the program is quitted once. After that, a new program can be used, and the version of the detailed help file matches that of the program. FIG. 12 shows an example of that sequence. FIG. 12 is activated at the same timing as in FIG. 2, and the same step numbers in FIG. 12 denote the same steps as in FIG. 2. Therefore, a description of the same steps as those in FIG. 2 will be omitted.

If the application program determines in step S205 that the version information of the detailed help file does not match that of the detailed help file included in the target application, the flow branches to step S1201. The application program checks in step S1201 if the version 107 of the detailed help file is older than the file version 104 of the application. More specifically, the application program compares the file version 104 of the application file with the file version 107 of the detailed help file to attain the checking processing in step S1201.

If the version information 107 of the detailed help file is older, the application program downloads the detailed help file from a server apparatus which integrally manages application programs and detailed help files via a network to which the computer in step S1203. The application program installs the downloaded help file. Of course, this step includes a step of prompting the user to confirm and the like. On the other hand, if it is determined that the version information 107 of the detailed help file is newer, the application program downloads a new application file from the aforementioned server apparatus via the network to which the computer is connected in step S1202. Note that the downloaded file is stored in the hard disk 4. Then, the application program installs the downloaded application file.

If it is determined in step S208 that no simplified help is found, the flow advances to step S1203, and the application program downloads a detailed help file. The application program then installs the downloaded help file.

In this manner, when the file is updated in correspondence with one of the application and detailed help file, which has a newer version, coherence between the application and help can be taken in the upper version. That is, in the second modification, as for the file identifier and file version included in the file identification information, the presence/absence of a detailed help file having file identification information which matches that of the detailed help file corresponding to the application program is checked. If the corresponding detailed help file is found, the file identifiers match, and the file versions do not match, version information of the application program or detailed help file is compared. One of the application program and detailed help file which is determined by this comparison processing to have older version information can be installed from an information processing apparatus (server) connected to the host computer.

[Third Modification]

The first and second embodiments can be combined. In the second embodiment, the location information of the detailed help file is used to check correspondence between the application and detailed help file. Alternatively, the checking processing can be attained based on the file identifier and version information as in the first embodiment. Contrary to this, in the first embodiment, the location information of the detailed help file can be used in place of the file identifier and version information. In this case, the version information is not compared. If the application file and detailed help file with the matched location information are found, an error message indicating that no corresponding detailed help file is found is displayed.

[Correspondence to Functional Blocks]

The above embodiments and their modifications implement respective processes for help display when the computer executes the programs shown in FIG. 2, 8, 12, and the like. That is, "determination means for determining the presence/absence of a detailed help file corresponding to a program" and "display control means for, when the determination means determines that the relevant detailed help file is found, displaying a help screen based on help screen information included in the relevant detailed help file, and, for, when the determination means determines that no relevant detailed help file is found, displaying a help screen based on help screen information installed together with the program are implemented when the CPU executes the programs.

By contrast, the respective functions (means) can also be implemented by hardware. In this case, respective blocks of the flowcharts shown in FIGS. 2, 8, and 12 are not steps of the programs but are functional blocks implemented by hardware. A directed line segment that connects neighboring functional blocks is data which is output from a given block and is input to the next block and a control signal which activates the next block. Interpreted this way, FIGS. 2, 8, and 12 are functional blocks including blocks corresponding to respective steps. Of course, a plurality of illustrated blocks may be combined to implement a single functional block. In this case, a plurality of blocks form single "means" together.

For example, steps S203, S205, and S208 in FIGS. 2 and 12 correspond to the "determination means". Also, steps S206 and S209 in FIGS. 2 and 12 correspond to the aforementioned "display control means". Furthermore, step S1203 in FIG. 12 corresponds to "installation means for installing a detailed help file". Moreover, "comparison means for comparing version information of the program with that of a detailed help file" corresponds to step S1201 in FIG. 12. In this case, "installation means corresponds to steps S1203 and S1202 in FIG. 12.

Furthermore, both recognition means and specifying means included in the display control means are included in step S206 in FIGS. 2 and 12. For example, the recognition means recognizes screen information displayed by a printer driver upon depression of a help button based on screen identification information corresponding to the displayed screen. Also, the specifying means specifies help screen information to be displayed based on the recognized screen information. A help screen is displayed based on the help screen information corresponding to the specified item.

On the other hand, "display control means for, when it is determined that a help file corresponding to a printer driver is found, displaying a user interface screen including a user operation area used to call a help screen, and for, when it is determined that no relevant help file is found, displaying a user interface screen so as to disable selection of the user operation area used to call the help screen corresponds to FIG. 8. That is, steps S213 and S214 correspond to determination means for determining if a help file corresponding to the program is found. In accordance with this determination result, the user operation area used to call the help screen is set in an inactive display state by a display button delete request in step S216. On the other hand, the user operation area used to call the help screen is set in an active display state by a display button add request in step S215. In step S217, a dialog is displayed according to the set display state.

In this manner, the flowcharts are also views showing functional blocks. Furthermore, the same description which explains the correspondence between the functions that belong to the apparatus and the flowcharts can also be applied to the correspondence between the steps that belong to the method and the flowcharts.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code. Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-197824 filed on Jul. 6, 2005, which is hereby incorporated by reference herein in its entirety.

What is claimed is:

1. An information processing apparatus for displaying a help screen based on help screen information, comprising:
   a first display control unit adapted to display a setting screen to set print setting information;
   an installation unit adapted to install in the information processing apparatus a simplified help file together with a printer driver of a specific version;
   a first determination unit adapted to determine whether a detailed help file corresponding to the printer driver and installed separately from the printer driver is present or not in the information processing apparatus;
   a second determination unit adapted to, when said first determination unit determines that the detailed help file corresponding to the printer driver is present, determine whether the detailed help file is a version that matches the specific version of the printer driver or not;
   a recognition unit adapted to recognize information contained in the setting screen displayed by said first display control unit; and
   a second display control unit adapted to,
      when said second determination unit determines that the version of the detailed help file matches the specific version of the printer driver, display a help screen corresponding to the recognized information contained in the setting screen based on help screen information included in the detailed help file, and to,
      when said second determination unit determines that the version of the detailed help file does not match the specific version of the printer driver, display a help screen corresponding to the recognized information contained in the setting screen based on help screen information included in the simplified help file installed together with the printer driver by said installation unit.

2. The apparatus according to claim 1, wherein, when said second determination unit determines that the version of the detailed help file does not match the specific version of the printer driver, said second display control unit displays a message indicating that the relevant detailed help file is absent.

3. The apparatus according to claim 1, wherein, when said second determination unit determines that the version of the detailed help file does not match the specific version of the printer driver, said second display control unit displays contents of a file held by the printer driver in place of the help screen.

4. The apparatus according to claim 1, wherein said installation unit is adapted to, when said second determination unit determines that the version of the detailed help file does not match the specific version of the printer driver, install a detailed help file that is a version matching the specific version of the printer driver.

5. The apparatus according to claim 1, further comprising a comparison unit adapted to, when said second determination unit determines that the version of the detailed help file does not match the specific version of the printer driver, compare the specific version of the printer driver and the version of the detailed help file,
   wherein said installation unit
      installs a detailed help file that is a version matching the specific version of the printer driver when said comparison unit determines that the version of the detailed help file is older than the specific version of the printer driver, and
      installs a printer driver of a version matching the version of the detailed help file when said comparison unit determines that the specific version of the printer driver already installed is older than the version of the detailed help file.

6. The apparatus according to claim 1, wherein said second display control unit displays the help screen using an output function provided by a computer.

7. An information processing method for controlling an information processing apparatus to display a help screen based on help screen information, comprising:
   a first display control step of displaying a setting screen on the information processing apparatus to set print setting information;
   an installation step of installing in the information processing apparatus a simplified help file together with a printer driver of a specific version;
   a first determination step of determining whether a detailed help file corresponding to the printer driver and installed separately from the printer driver is present or not in the information processing apparatus;
   a second determination step of, when it is determined in said first determination step that the detailed help file corresponding to the printer driver is present, determining whether the detailed help file has a version that matches the version of the printer driver or not;
   a recognition step of recognizing information contained in the setting screen displayed in said first display control step; and
   a second display control step of,
      when it is determined in said second determination step that the version of the detailed help file matches the specific version of the printer driver, displaying a help screen corresponding to the recognized information contained in the setting screen based on help screen information included in the detailed help file, and of
      when it is determined in said second determination step that the version of the detailed help file does not match the specific version of the printer driver, displaying a help screen corresponding to the recognized information contained in the setting screen based on help screen information included in the simplified help file installed together with the printer driver in said installation step.

8. The method according to claim 7, wherein, when it is determined in said second determination step that the version of the detailed help file does not match the specific version of the printer driver, said second display control step includes displaying a message indicating that the relevant detailed help file is absent.

9. The method according to claim 7, wherein, when it is determined in said second determination step that the version of the detailed help file does not match the specific version of the printer driver, said second display control step includes displaying contents of a file held by the printer driver in place of the help screen.

10. The method according to claim 7, wherein said installation step includes, when it is determined in said second determination step that the version of the detailed help file does not match the specific version of the printer driver, installing a detailed help file that is a version matching the specific version of the printer driver.

11. The method according to claim 7, further comprising
a comparison step of, when it is determined in said second determination step that the version of the detailed help file does not match the specific version of the printer driver, comparing the specific version of the printer driver and the version of the detailed help file,
wherein said installation step includes
installing a detailed help file that is a version matching the specific version of the printer driver when it is determined in said comparison step that the version of the detailed help file is older than the specific version of the printer driver, and
installing a printer driver of a version matching the version of the detailed help file when it is determined in said comparison step that the specific version of the printer driver already installed is older than the version of the detailed help file.

12. The method according to claim 7, wherein said second display control step includes displaying the help screen using an output function provided by a computer.

13. A non-transitory computer-readable medium storing, in executable form, a computer program implementing a method for controlling an information processing apparatus to display a help screen based on help screen information, the method comprising:
a first display control step of displaying a setting screen in the information processing apparatus to set print setting information;
an installation step of installing in the information processing apparatus a simplified help file together with a printer driver of a specific version;
a first determination step of determining whether a detailed help file corresponding to the printer driver and installed separately from the printer driver is present or not in the information processing apparatus;
a second determination step of, when it is determined in said first determination step that the detailed help file corresponding to the printer driver is present, determining whether version of the detailed help file matches the specific version of the printer driver or not;
a recognition step of recognizing information contained in the setting screen displayed in said first display control step; and
a second display control step of,
when it is determined in said second determination step that the version of the detailed help file matches the specific version of the printer driver, displaying a help screen corresponding to the recognized information contained in the setting screen based on help screen information included in the detailed help file, and of,
when it is determined in said second determination step that the version of the detailed help file does not match the specific version of the printer driver, displaying a help screen corresponding to the recognized information contained in the setting screen based on help screen information included in the simplified help file installed together with the printer driver in said installation step.

14. The apparatus according to claim 1, wherein
said first and second determination units execute determination processing when a predetermined operation is made on a setting item in the setting screen containing setting items, and
said second display control unit displays the help screen for the setting item on which the predetermined operation is made if there exists the detailed help file corresponding to the printer driver and the version of the detailed help file matches the specific version of the printer driver.

15. The method according to claim 7, wherein
said first and second determination steps include executing determination processing when a predetermined operation is made on a setting item in the setting screen containing setting items, and
said second display control step includes displaying the help screen for the setting item on which the predetermined operation is made if there exists the detailed help file corresponding to the printer driver and the version of the detailed help file matches the specific version of the printer driver.

16. The computer-readable medium according to claim 1, wherein
said first and second determination steps include executing determination processing when a predetermined operation is made on a setting item in the setting screen containing setting items, and
said second display control step includes displaying the help screen for the setting item on which the predetermined operation is made if there exists the detailed help file corresponding to the printer driver and the version of the detailed help file matches the specific version of the printer driver.

* * * * *